US011121574B2

(12) United States Patent
Ha et al.

(10) Patent No.: US 11,121,574 B2
(45) Date of Patent: Sep. 14, 2021

(54) METHOD FOR TRANSMITTING POWER AND ELECTRONIC DEVICE SUPPORTING THE SAME

(71) Applicant: SAMSUNG ELECTRONICS CO., LTD., Suwon-si (KR)

(72) Inventors: Young Mi Ha, Suwon-si (KR); Jung Oh Sung, Suwon-si (KR); Kwan Bae Son, Suwon-si (KR); Jung Min Lee, Suwon-si (KR); Jae Mu Ha, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 15/664,110

(22) Filed: Jul. 31, 2017

(65) Prior Publication Data

US 2018/0034307 A1   Feb. 1, 2018

(30) Foreign Application Priority Data

Aug. 1, 2016 (KR) .................. 10-2016-0098236

(51) Int. Cl.
*H02J 7/02* (2016.01)
*H02J 7/00* (2006.01)
*H02J 50/12* (2016.01)

(52) U.S. Cl.
CPC ............... *H02J 7/025* (2013.01); *H02J 7/00* (2013.01); *H02J 7/007* (2013.01); *H02J 7/0088* (2013.01); *H02J 50/12* (2016.02)

(58) Field of Classification Search
CPC combination set(s) only.
See application file for complete search history.

(56) References Cited

U.S. PATENT DOCUMENTS 9,287,039 B2   3/2016 Lee et al.
9,319,494 B2   4/2016 Nakatani
(Continued)

FOREIGN PATENT DOCUMENTS

EP   2 685 601   1/2014
EP   2 752 958   7/2014
(Continued)

OTHER PUBLICATIONS

Bae, WO2015037949 translation Charging Control Device, Charging Control Method Mar. 2015 (Year: 2015).*
(Continued)

*Primary Examiner* — Drew A Dunn
*Assistant Examiner* — Tynese V McDaniel
(74) *Attorney, Agent, or Firm* — Nixon & Vanderhye P.C.

(57) ABSTRACT

An electronic device which is wirelessly charged through an external power transmitting device includes a conductive pattern in which a current is induced depending on a power signal transmitted by the external power transmitting device, an adjustment circuit that configured to generate a voltage signal using the current, a load configured to be charged through the voltage signal, and a control circuit electrically connected with the conductive pattern, the adjustment circuit, and the load. Upon recognizing the external power transmitting device, the control circuit is configured to generate a power control signal including information about intensity of the power signal and to transmit the power control signal to the external power transmitting device through the conductive pattern, and the conductive pattern is configured to receive the power signal, the intensity of which is changed depending on the power control signal.

13 Claims, 11 Drawing Sheets

(56) References Cited

U.S. PATENT DOCUMENTS

| | | | |
|---|---|---|---|
| 9,325,187 B2 | 4/2016 | Lee et al. | |
| 9,356,475 B2 | 5/2016 | Kim et al. | |
| 9,444,276 B2 | 9/2016 | Hong et al. | |
| 9,653,950 B2 | 5/2017 | Jung | |
| 9,821,672 B2 | 11/2017 | Chae et al. | |
| 2007/0069691 A1* | 3/2007 | Fukuda | H02J 7/0071 320/128 |
| 2012/0212070 A1* | 8/2012 | Tanabe | H02J 50/05 307/104 |
| 2013/0119780 A1 | 5/2013 | Kim et al. | |
| 2013/0307468 A1 | 11/2013 | Lee et al. | |
| 2014/0009109 A1* | 1/2014 | Lee | H01F 38/14 320/108 |
| 2014/0009110 A1 | 1/2014 | Lee et al. | |
| 2014/0191713 A1 | 7/2014 | Hong et al. | |
| 2014/0354069 A1 | 12/2014 | Jung | |
| 2015/0045091 A1 | 2/2015 | Nakatani | |
| 2015/0171635 A1* | 6/2015 | Aikawa | H02J 5/005 320/108 |
| 2016/0001663 A1 | 1/2016 | Chae et al. | |
| 2016/0028267 A1 | 1/2016 | Lee et al. | |
| 2016/0056664 A1* | 2/2016 | Partovi | H02J 7/025 307/104 |
| 2016/0079794 A1 | 3/2016 | Cho et al. | |
| 2016/0114687 A1* | 4/2016 | Ichikawa | B60L 5/005 701/22 |
| 2016/0141884 A1 | 5/2016 | Lee et al. | |
| 2016/0172895 A1 | 6/2016 | Lee et al. | |
| 2016/0226296 A1* | 8/2016 | Bae | H02J 5/00 |
| 2016/0380464 A1* | 12/2016 | Chin | H02J 7/025 320/108 |
| 2017/0187232 A1* | 6/2017 | Jo | B60L 11/18 |

FOREIGN PATENT DOCUMENTS

| | | | |
|---|---|---|---|
| JP | 2015-226396 | 12/2015 | |
| KR | 10-1034740 | 5/2011 | |
| KR | 10-2015-0084625 | 7/2015 | |
| KR | 10-2016-0030779 | 3/2016 | |
| WO | 2013/095068 | 6/2013 | |
| WO | 2014/010907 | 1/2014 | |
| WO | 2015/002422 | 1/2015 | |
| WO | WO-2015037949 A1 * | 3/2015 | H02J 5/00 |
| WO | WO-2015182688 A1 * | 12/2015 | H04M 1/00 |

OTHER PUBLICATIONS

WO-2015182688, Okamoto Atsumi, Dec. 2015 Electronic Apparatus and Method for Notifying Charge in Electronic Apparatus (Year: 2015).*

Extended Search Report dated Oct. 24, 2017 in counterpart European Patent Application No. EP17184220.6.

Search Report dated Oct. 25, 2017 in counterpart International Patent Application No. PCT/KR2017/008194.

* cited by examiner

801

810　　　　820

| Reason | Value | |
|---|---|---|
| Unknown | 0x00 | ~831 |
| Charge Complete | 0x01 | ~832 |
| Internal Fault | 0x02 | ~833 |
| Over Temperature | 0x03 | ~834 |
| Over Voltage | 0x04 | ~835 |
| Over Current | 0x05 | ~836 |
| Battery Failure | 0x06 | ~837 |
| Breconfigure | 0x07 | ~838 |
| No Response | 0x08 | ~839 |
| Reserved | 0x09...0xFF | ~840 |

FIG.8

METHOD FOR TRANSMITTING POWER AND ELECTRONIC DEVICE SUPPORTING THE SAME

CROSS-REFERENCE TO RELATED APPLICATION

This application is based on and claims priority under 35 U.S.C. § 119 to a Korean patent application filed on Aug. 1, 2016 in the Korean Intellectual Property Office and assigned Serial number 10-2016-0098236, the disclosure of which is incorporated by reference herein in its entirety.

TECHNICAL FIELD

The present disclosure relates generally to a method for wirelessly transmitting power and a device supporting the same.

BACKGROUND

A mobile electronic device such as a smartphone, a tablet PC, or the like may include a battery therein. The battery may be charged through a wired connector connected with the electronic device. Recently, there have been used technologies for supplying power from a device, which wirelessly transmits the power, to an electronic device without connection of the wired connector.

A magnetic induction scheme, a magnetic resonance scheme, or the like is used as a wireless power supply scheme. The magnetic induction scheme that uses electromagnetic induction between coils may be used to supply the power when a distance between a power transmitting device and a power receiving device is short.

The magnetic resonance scheme that uses magnetic resonance between coils may be used to supply the power even though the power transmitting device is spaced apart by a few meters from the power receiving device. In the case of the magnetic resonance scheme, power transfer efficiency may be relatively reduced and electromagnetic waves harmful to a human body may be generated.

A conventional electronic device receives the power through a wireless charging pad and charges an internal battery through a receiver coil, a rectifier circuit, and the like. In this case, if the electronic device and the wireless charging pad are misaligned, issues such as voltage swing, a change in a charging current, a noise, and high temperature may occur.

SUMMARY

Example aspects of the present disclosure address at least the above-mentioned problems and/or disadvantages and to provide at least the advantages described below.

In accordance with an example aspect of the present disclosure, an electronic device which is wirelessly charged through an external power transmitting device includes a conductive pattern in which a current is induced based on a power signal transmitted by the external power transmitting device, an adjustment circuit configured to generate a voltage signal using the current, a load charged through the voltage signal, and a control circuit electrically connected with the conductive pattern, the adjustment circuit, and the load. When recognizing the external power transmitting device, the control circuit is configured to generate a power control signal including information about intensity of the power signal and to transmit the power control signal to the external power transmitting device through the conductive pattern, and the conductive pattern is configured to receive the power signal, the intensity of which is changed based on the power control signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIG. 8 is a diagram illustrating an example configuration of EPT data, according to various example embodiments;

Throughout the drawings, it should be noted that like reference numbers are used to depict the same or similar elements, features, and structures.

DETAILED DESCRIPTION

Figure 1:
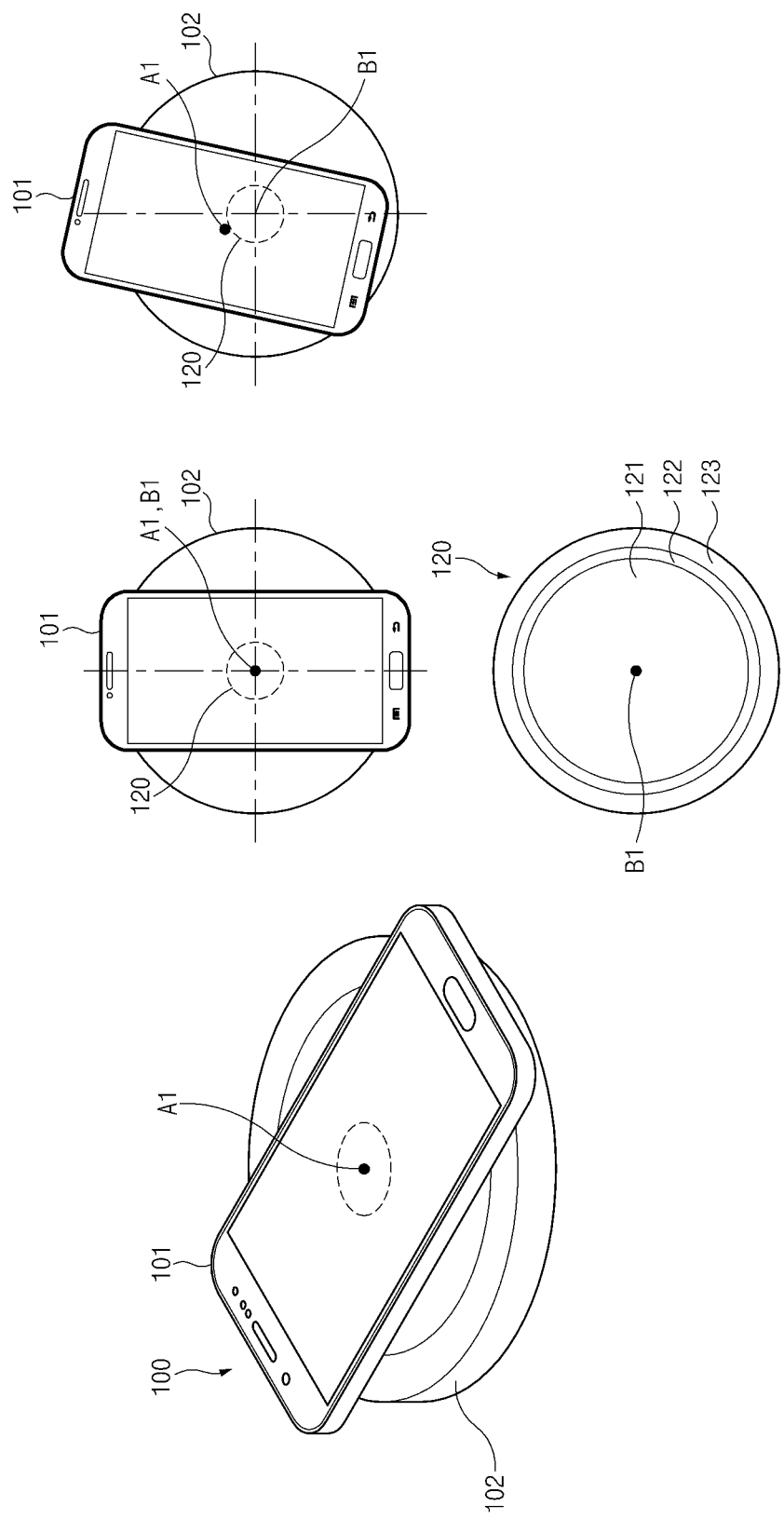
FIG. 1 is a diagram illustrating an example wireless charging system, according to various example embodiments.

Hereinafter, various example embodiments of the present disclosure will be described with reference to the accompanying drawings. Accordingly, those of ordinary skill in the art will recognize that modifications, equivalents, and/or alternatives of the various example embodiments described herein can be made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. On the other hand, when an element (for example, a first element) is referred to as being "directly coupled with/to" or "directly connected to" another element (for example, a second element), it should be understood that there are no intervening element (for example, a third element).

According to the situation, the expression "configured to" used herein may be interchangeably with, for example, the expression "suitable for", "having the capacity to", "designed to", "adapted to", "made to", or "capable of". The term "configured to (or set to)" must not refer only "specifically designed to" in hardware. Instead, the expression "a device configured to" may refer to a situation in which the device is "capable of" operating together with another device or other components. CPU, for example, a "processor configured to (or set to) perform A, B, and C" may refer to a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe the various example embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various example embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices, or the like, but is not limited thereto. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits), or the like, but is not limited thereto.

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel, or the like, but is not limited thereto.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler), or the like, but is not limited thereto.

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device), or the like, but is not limited thereto. In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a diagram illustrating an example wireless charging system, according to various example embodiments. In FIG. 1, a form, alignment, or the like of an electronic device and a power transmitting device is an example, but is not limited thereto.

Referring to FIG. 1, a wireless charging system 100 may wirelessly transmit and receive power. The wireless charging system 100 may be a system that is capable of charging a load (e.g., a battery) in an electronic device 101, not connecting a separate wired charging connector with the electronic device 101 (e.g., a portable telephone).

According to various embodiments, the wireless charging system 100 may include the electronic device 101 and a power transmitting device 102. The wireless charging system 100 may use an inductive coupling manner based on an electromagnetic induction phenomenon. In the case of the inductive coupling manner, the power transmitting device 102 may generate a magnetic field by applying a current to a power transmitting circuit. The electronic device 101 may receive induced electromotive force that is generated in a power receiving circuit by the magnetic field. The electronic device 101 may charge a battery using the induced electromotive force.

In the case where the electronic device 101 is disposed adjacent to the power transmitting device 102 within a specified distance (e.g., within 1 cm), the electronic device 101 may receive the power from the power transmitting device 102. The power may allow a battery in the electronic device 101 to be charged. The electronic device 101 is exemplified in FIG. 1 as being seated on an interface surface 120 (or a charging surface, or a charging pad, the same as above) of the power transmitting device 102. However, embodiments of the present disclosure may not be limited thereto.

The electronic device 101 may receive the power in the form of an electromagnetic wave that is based on an electromagnetic induction method between conductive patterns (e.g., coils), from the power transmitting device 102. For example, the above-described method may refer to a method in which the magnetic field generated by a primary coil in the power transmitting device 102 allows the induced current to flow into a secondary coil in the electronic device 101 such that energy is supplied.

Charging efficiency may vary depending on an alignment state (e.g., whether central axes of coils are the same as each other or a distance between central axes) between the primary coil in the power transmitting device 102 and the secondary coil in the electronic device 101. For example, the secondary coil in the electronic device 101 may be wound about a virtual point A1, and the primary coil in the power transmitting device 102 may be wound about a virtual point B1.

The interface surface 120 of the power transmitting device 102 may be divided into a normal charge area 121, a heat area 122, and a charge restriction area 123 with respect to the virtual point B1.

1) In the case where the virtual point A1 being the center of the secondary coil in the electronic device 101 is disposed in the normal charge area 121, a wireless charging procedure may proceed within a specified temperature range.

2) In the case where the virtual point A1 being the center of the secondary coil in the electronic device 101 is disposed in the heat area 122, the temperature of the electronic device 101 may increase to be equal to or greater than the specified temperature range, in the charging procedure.

3) In the case where the virtual point A1 being the center of the secondary coil in the electronic device 101 is disposed in the charge restriction area 123, the wireless charging procedure may not proceed.

According to various example embodiments, the electronic device 101 may generate a power control signal for controlling a power signal to be transmitted by the power transmitting device 102. The electronic device 101 may transmit the generated power control signal to the power transmitting device 102 using the secondary coil thereof. For example, the power control signal may include at least one of a control error signal, a received power signal, a charge status signal, or an end power transfer signal.

The electronic device 101 may generate the power control signal based on a state where the electronic device 101 communicates with the power transmitting device 102, the temperature of the electronic device 101, motion of the electronic device 101, or the like. The electronic device 101 may transmit the generated power control signal to the primary coil in the power transmitting device 102 using the secondary coil thereof. The power transmitting device 102 may adjust the power to be transmitted, based on the power control signal received through the primary coil. Power controlling methods of various manners will be described in greater detail below with reference to FIGS. 2 to 8.

Figure 2:
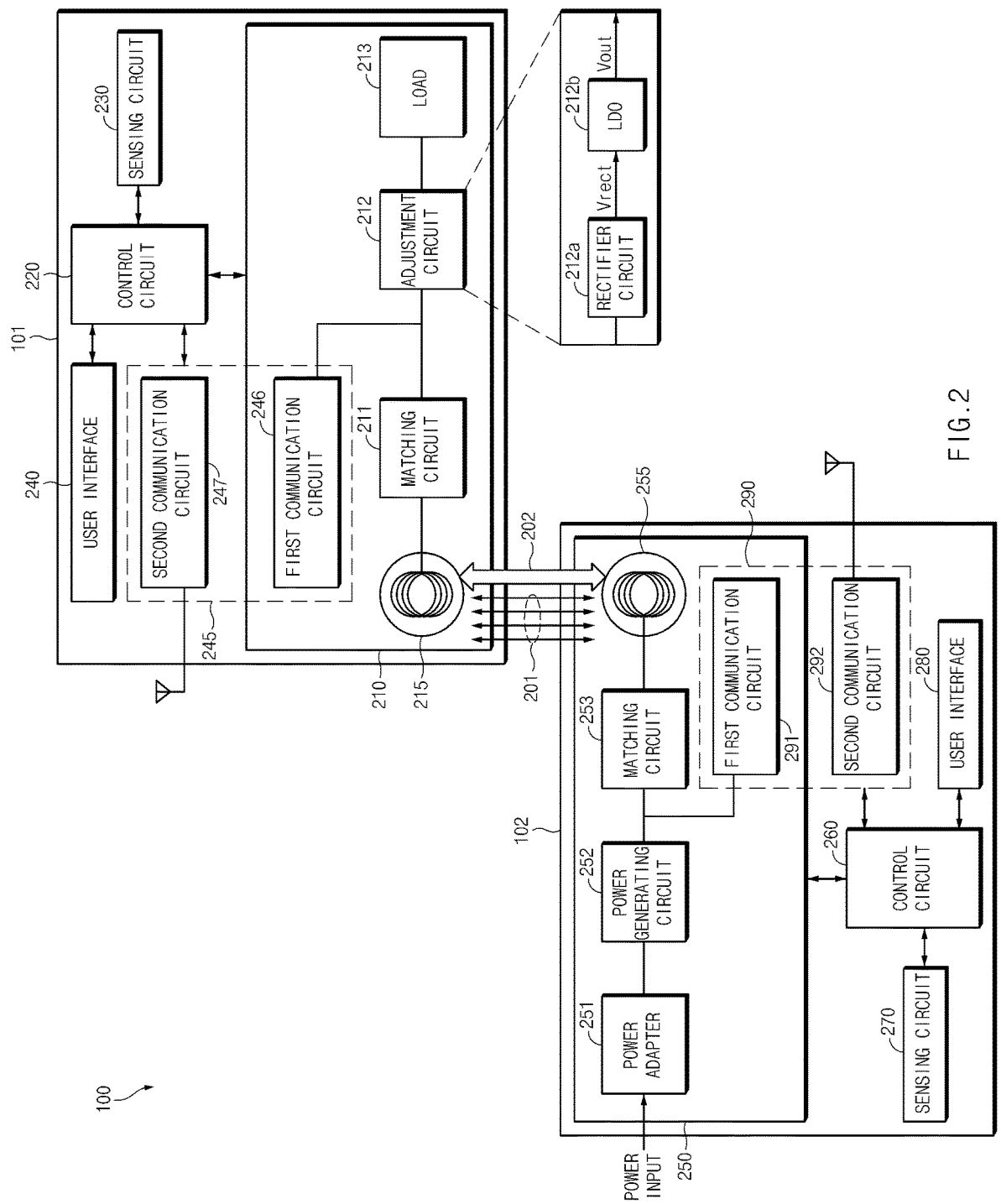
FIG. 2 is a block diagram illustrating an example electronic device and an example power transmitting device, according to various example embodiments of the present disclosure.

FIG. 2 is a block diagram illustrating an example electronic device and an example power transmitting device, according to various example embodiments of the present disclosure. FIG. 2 is, but is not limited to, an example.

For example, the electronic device 101 may include a power receiving circuit 210, a control circuit 220, a sensing circuit 230, a user interface (e.g., including interface circuitry) 240, and a communication circuit 245. The power receiving circuit 210 may include a matching circuit 211, an adjustment circuit 212, a load 213, and a conductive pattern 215.

The power receiving circuit 210 may wirelessly receive power, which is in the form of an electromagnetic wave generated from a conductive pattern 255 of a power transmitting circuit 250 of the power transmitting device 102, through the conductive pattern 215. For example, the power receiving circuit 210 may receive the power using induced electromotive force that is formed in the conductive pattern 215 of the power receiving circuit 210 due to an electromagnetic wave generated from the conductive pattern 255 of the power transmitting circuit 250.

The matching circuit 211 may perform impedance matching. For example, in the case where the electromagnetic wave generated from the conductive pattern 255 of the power transmitting device 102 is transmitted to the conductive pattern 215, the matching circuit 211 may adjust a frequency bandwidth used to receive the electromagnetic wave, by adjusting impedance. The matching circuit 211 may include, for example, and without limitation, at least one of an inductor (e.g., a coil), a capacitor, or a switch. For example, the control circuit 220 may control a connection state between the inductor and the capacitor through the switch.

The adjustment circuit 212 may output a selected voltage regardless of an input voltage. For example, the adjustment circuit 212 may change the voltage applied to the conductive pattern 215 into a voltage (e.g., 5 V) corresponding to a battery depending on the reception of wireless power and may output the changed voltage. For example, the adjustment circuit 212 may set a minimum value or a maximum value of a voltage to be changed.

For example, the adjustment circuit 212 may include, for example, and without limitation, a rectifier circuit 212a and a low drop out (LDO) 212b. The rectifier circuit 212a may include, for example, and without limitation, a diode (e.g., a bridge diode) and may rectify a current received from the conductive pattern 215 using the diode. The rectifier circuit 212a may output a rectification voltage Vrect. The LDO 212b may change the rectification voltage Vrect into an output voltage Vout to be provided to the load 213.

The load 213 may receive the power from the adjustment circuit 212. For example, in the case where the load 213 is a battery, the battery may be charged by the received power.

The sensing circuit 230 may sense at least one of a motion change, a temperature change, ambient illuminance, or ambient sound of the electronic device 101. For example, the sensing circuit 230 may include, for example, and without limitation, at least one of a motion sensor (e.g., an acceleration sensor), a thermistor, an illuminance sensor, or a sound sensor.

According to various example embodiments, the thermistor may measure temperature at a location adjacent to the conductive pattern 215. The measured temperature value may be used such that the control circuit 220 generates a power control signal. Additional information about power control using the thermistor may be provided through FIG. 6.

According to various example embodiments, the motion sensor may be used to measure a movement range of the electronic device 101. The control circuit 220 may generate the power control signal or may control the user interface 240, based on the degree of movement of the electronic device 101. Additional information about power control using the motion sensor may be provided through FIG. 7.

The control circuit 220 may calculate (determine) an amount of necessary power based on battery state information of the electronic device 101. For example, in the case where the power transmitting device 102 capable of transmitting the wireless power is verified, the control circuit 220 may calculate the amount of necessary power based on, for example, and without limitation, at least one of total battery capacity, a battery level, the number of times of charging, a battery usage amount, a charging mode, or a wireless reception frequency band of the electronic device 101. The control circuit 220 may transmit information about the calculated amount of power to the power transmitting device 102 by using a communication circuit 245.

For example, the control circuit 220 may periodically or randomly monitor a current or a voltage that is induced by the conductive pattern 215. For example, the control circuit 220 may determine the amount of power, for which the electronic device 101 makes a request to the power transmitting device 102, based on the calculated amount of power and the monitored current or voltage.

The control circuit 220 may generate the power control signal for controlling the power signal to be transmitted by the power transmitting device 102. The control circuit 220 may generate the power control signal based on a state where the electronic device 101 initially recognizes the power transmitting device 102, the temperature of the electronic device 101, motion of the electronic device 101, or the like. The generated power control signal may be transmitted to the power transmitting device 102 using the conductive pattern 215.

The user interface 240 may include various circuitry to output information about a charge status of the electronic device 101. For example, in the case where the user interface 240 includes a display, the user interface 240 may display at least one of the total battery capacity, the battery level, a battery charging amount, the battery usage amount, or estimated charging time of the electronic device 101.

The user interface 240 may output state information of the battery and information about charging. For example, in the case where the electronic device 101 is disconnected from the power transmitting device 102 during wireless charging, the user interface 240 may provide charging information to a user, by generating a popup box in a display or by outputting sound or vibration.

The communication circuit 245 may transmit or receive information about the wireless charging to or from the power transmitting device 102. For example, the communication circuit 245 may, for example, and without limitation, unicast, multicast, or broadcast the information about the wireless charging. The communication circuit 245 may include at least one of a first communication circuit 246 or a second communication circuit 247. The first communication circuit 246 and the second communication circuit 247 are separately illustrated in FIG. 2. However, the first communication circuit 246 and the second communication circuit 247 may be implemented with one integrated circuit, or one of the first communication circuit 246 and the second communication circuit 247 may be omitted.

According to various embodiments, the first communication circuit 246 may be implemented with at least a part of the power receiving circuit 210 and may communicate with the power transmitting device 102 in an in-band manner. For example, the first communication circuit 246 may transmit or receive a signal to or from the power transmitting device 102 in the in-band manner using the conductive pattern 215. The in-band manner may refer to a method of transmitting or receiving the signal between the electronic device 101 and the power transmitting device 102 using a frequency bandwidth used to transmit the wireless power.

For example, the first communication circuit 246 may transmit the modulated signal to the power transmitting device 102 using the frequency bandwidth used to transmit the wireless power. For example, the first communication circuit 246 may extract necessary information from a signal by decrypting a frequency and/or magnitude of the signal received from the power transmitting device 102.

According to various embodiments, the first communication circuit 246 may transmit a power control signal 202 generated by the control circuit 220 to the power transmitting device 102. The first communication circuit 246 may transmit the power control signal 202 through the conductive pattern 215. The conductive pattern 255 of the power transmitting device 102 may receive the power control signal 202 and may transmit the power control signal 202 to a control circuit 260 therein.

According to various embodiments, the power control signal 202 may include an end of power transfer (EPT) packet. The EPT packet may refer to a signal standard defined according to Wireless Power Consortium (WPC) specification. Additional information about the EPT packet will be provided through FIG. 8.

According to various embodiments, for example, the second communication circuit 247 may be separated from the power receiving circuit 210 and may communicate with the power transmitting device 102 in an out-of-band manner. For example, the second communication circuit 247 may transmit or receive the signal to or from the power transmitting device 102 in the out-of-band manner. The out-of-band manner may refer to a method of transmitting or receiving information needed to transmit power between the electronic device 101 and the power transmitting device 102 using a separate frequency bandwidth that is not a frequency bandwidth used to transmit the wireless power. The second communication circuit 247 of the electronic device 101 may transmit or receive the signal to or from a communication circuit 290 (e.g., a second communication circuit 292) of the power transmitting device 102 using for example, and without limitation, at least one of near field communication (NFC), Zigbee communication, infrared (IR) communication, visible light communication, Bluetooth communication, or a Bluetooth low energy (BLE) scheme.

According to various embodiments, the second communication circuit 247 may transmit information (e.g., the amount of necessary power) about charging of the load 213 to the power transmitting device 102.

The power transmitting device 102 may include the power transmitting circuit 250, the control circuit 260, a sensing circuit 270, a user interface (e.g., including interface circuitry) 280, and the communication circuit 290. The power transmitting circuit 250 may include a power adapter 251, a power generating circuit 252, a matching circuit 253, the conductive pattern 255, and a first communication circuit 291.

The power adapter 251 may receive an alternating current (AC) or direct current (DC) current from an external device (e.g., an external charger) and may output the DC current. An amount of DC current output by the power adapter 251 may be controlled by the control circuit 260. The DC current output from the power adapter 251 may be transmitted to the power generating circuit 252.

After converting the DC current received from the power adapter 251 into the AC current, the power generating circuit 252 may output the AC current. The power generating circuit 252 may include a predetermined amplifier (not illustrated). If the DC current input through the power adapter 251 is smaller than a set gain, the power generating circuit 252 may amplify the received DC current by using the amplifier by the set gain. The power generating circuit 252 may receive a control signal from the control circuit 260 and may convert the received DC current into the AC current based on the received control signal.

For example, the power generating circuit 252 may convert the DC current received through a predetermined inverter into the AC current. For example, the power generating circuit 252 may include a gate driving circuit (not illustrated). For example, the gate driving circuit may convert the received DC current into the AC current by selectively passing the received DC current. For example, the power generating circuit 252 may generate an AC power signal through a power generator (e.g., an oscillator).

The matching circuit 253 may perform impedance matching on the conductive pattern 255. For example, if an AC signal output from the power generating circuit 252 is transmitted to the conductive pattern 255, an electromagnetic wave may be generated from the conductive pattern 255. The matching circuit 253 may control efficiency of an output power, which is transmitted to the electronic device 101 after being generated through the conductive pattern 255, by adjusting an internal impedance value of the matching circuit 253. According to various embodiments, the matching circuit 253 may include at least one of an inductor (e.g., a coil), a capacitor, or a switch device. For example, the control circuit 260 may adjust the internal impedance value of the matching circuit 253 by controlling a connection state between an inductor and a capacitor by using the switch device of the matching circuit 253.

The conductive pattern 255 may generate a magnetic field for inducing a current in the electronic device 101. The conductive pattern 255 may include a coil and/or a capacitor that converts the input AC power into the electromagnetic wave having a specified resonant frequency. For example, the conductive pattern 255 may be configured to have a resonant frequency the same as the conductive pattern 215 of the electronic device 101. For example, and without limitation, the resonant frequency may be 87 kHz~205 kHz, 277 kHz~357 kHz, 3.28 MHz, or 6.78 MHz.

According to various embodiments, the conductive pattern 255 may receive the power control signal 202 transmitted through the conductive pattern 215 of the electronic device 101. The conductive pattern 255 may transmit the received power control signal 202 to the control circuit 260. The power control signal 202 may include information for interrupting a power signal 201 output through the conductive pattern 255 or adjusting intensity of the power signal 201.

Power transfer efficiency between the electronic device 101 and the power transmitting device 102 in the wireless charging system 100 according to various embodiments may be affected by alignment and/or a distance between the electronic device 101 and the power transmitting device 102. In the case where a central axis of the conductive pattern 215 of the electronic device 101 is the same as a central axis of the conductive pattern 255 of the power transmitting device 102, the power transfer efficiency may be maximized. As the distance between the central axes becomes longer, the power transfer efficiency may be reduced.

According to various embodiments, each of the electronic device 101 and the power transmitting device 102 may include a magnetic body. In the case where the electronic device 101 and the power transmitting device 102 are adjacent to each other, the conductive pattern 215 of the electronic device 101 and the conductive pattern 255 of the power transmitting device 102 may be disposed adjacent to each other due to attractive force between the magnetic body included in the electronic device 101 and the magnetic body included in the power transmitting device 102. For example, the magnetic body may be disposed in the conductive pattern 215 of the electronic device 101 or in the conductive pattern 255 of the power transmitting device 102. Alternatively, the magnetic body may be disposed adjacent to the outside of conductive pattern 215 of the electronic device 101 or the outside of the conductive pattern 255 of the power transmitting device 102.

The sensing circuit 270 may sense at least one of a temperature change, ambient illuminance, or ambient sound of the power transmitting device 102. For example, the control circuit 260 may adjust the amount of power, which is transmitted to the electronic device 101, based on the temperature change, the ambient illuminance, or the ambient sound of the power transmitting device 102 sensed by the sensing circuit 270. For example, the sensing circuit 270 may include at least one of a thermistor, an illuminance sensor, or a sound sensor.

The control circuit 260 may determine the amount of power, which is transmitted to the electronic device 101, based on monitoring of the change in a current or a voltage in the power transmitting circuit 250.

According to various embodiments, based on the power control signal 202 received through the conductive pattern 255, the control circuit 260 may interrupt the power signal 201 output through the conductive pattern 255 or may adjust the intensity of the power signal 201.

According to various embodiments, the control circuit 260 may transmit or receive information to or from the electronic device 101 using the communication circuit 290. For example, the control circuit 260 may determine an operating state of the electronic device 101 based on the information received from the electronic device 101. The control circuit 260 may determine or change the amount of power, which is transmitted to the electronic device 101, based on the determined operating state of the electronic device 101.

For example, the control circuit 260 may output a state of the electronic device 101 using the user interface 280 based on the information received from the electronic device 101. For example, the control circuit 260 may display the state of the electronic device 101 through a light emitting diode (LED). The information received from the electronic device 101 may include at least one of state information about a load 213 (e.g., a battery) of the electronic device 101, power amount control information about adjustment of the amount of power transmitted to the electronic device 101, environment information associated with wireless charging of the electronic device 101, time information. For example, the state information about the load 213 may include at least one of total battery capacity of a battery, a battery usage amount, a battery level, the number of times of charging, a voltage of the battery, a current of the battery, a charging mode, a charging method, or a wireless reception frequency bandwidth of the electronic device 101. For example, the power amount control information may include information for controlling the amount of power to be received from the power transmitting device 102 based on a change in the amount of power, which allows the electronic device 101 to be charged during the wireless charging. For example, the environment information may include at least one of internal temperature information or ambient temperature information of the electronic device 101, illuminance (brightness) information around the electronic device 101, or sound (noise) information around the electronic device 101.

The user interface 280 may include various interface circuitry and provide an output associated with state information or ambient environment information of the power transmitting device 102. For example, the user interface 280 may provide an output configured to guide a location at which the power transmitting device 102 is disposed. For example, the user interface 280 may guide a location at which the power transmitting device 102 is disposed, by outputting at least one of an image, a text message, vibration, a voice message, and/or effect sound. For example, the user interface 280 may include at least one of a display, a vibrating element, a speaker, or an LED.

The communication circuit 290 may transmit or receive a signal associated with the wireless charging to or from the electronic device 101. The communication circuit 290 may operate to be the same as or similar to the communication circuit 245 of the electronic device 101.

Figure 3:
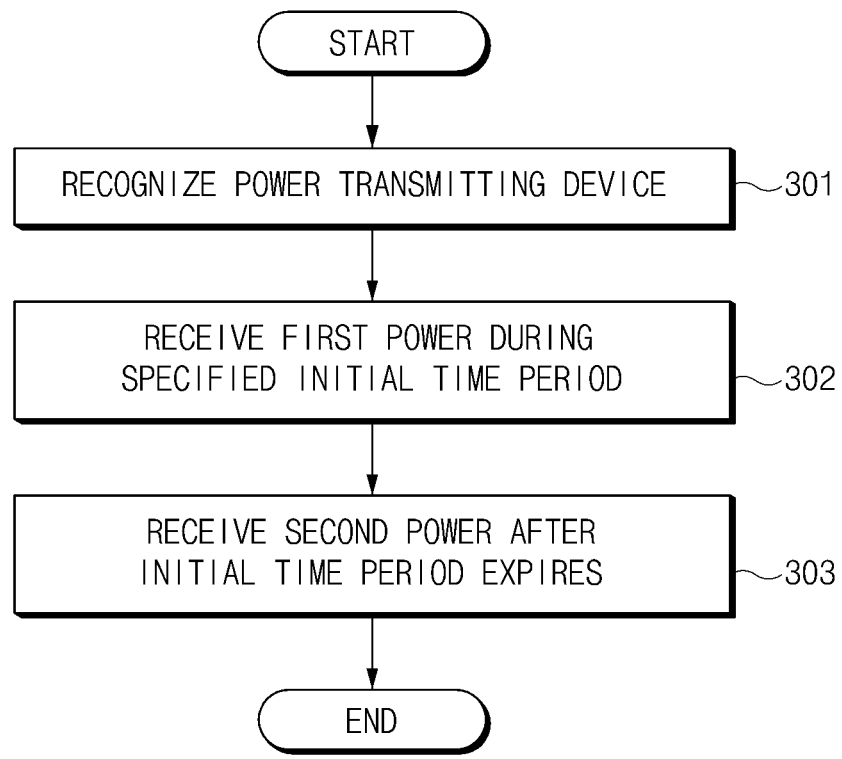
FIG. 3 is a flowchart illustrating an example power receiving method, according to various example embodiments.

FIG. 3 is a flowchart illustrating an example power receiving method, according to various example embodiments.

Referring to FIG. 3, in operation 301, the electronic device 101 may recognize the external power transmitting device 102. For example, the electronic device 101 may recognize the power transmitting device 102 by verifying a change of electromotive force induced by the conductive pattern 215. For another example, the electronic device 101 may recognize the power transmitting device 102 in response to a search signal output by the power transmitting device 102. In the case where the electronic device 101 wants to receive power, the electronic device 101 may transmit a response signal to the power transmitting device 102.

In operation 302, the electronic device 101 may receive first power during a specified initial time period (e.g., 3 seconds). The first power may be higher in level than reference power that is generally output by the power transmitting device 102 for charging.

According to an embodiment, the first power may be displayed as intensity of a current induced by the conductive pattern 215 or intensity of the induced electromotive force. According to another embodiment, the first power may be displayed as an amount of power that is received by the power receiving circuit 210 during the specified initial time period.

According to various embodiments, the first power may be one of 1) a value that is determined in advance between the electronic device 101 and the power transmitting device 102, 2) a value defined in a power control signal that is transmitted to the power transmitting device 102 by the electronic device 101, or 3) a value determined in the power transmitting device 102.

In operation 303, the electronic device 101 may receive second power after the initial time period expires. The second power may be lower in level than the first power in operation 302. For example, the second power may be a reference power that is generally output by the power transmitting device 102 for charging.

Figure 4A:
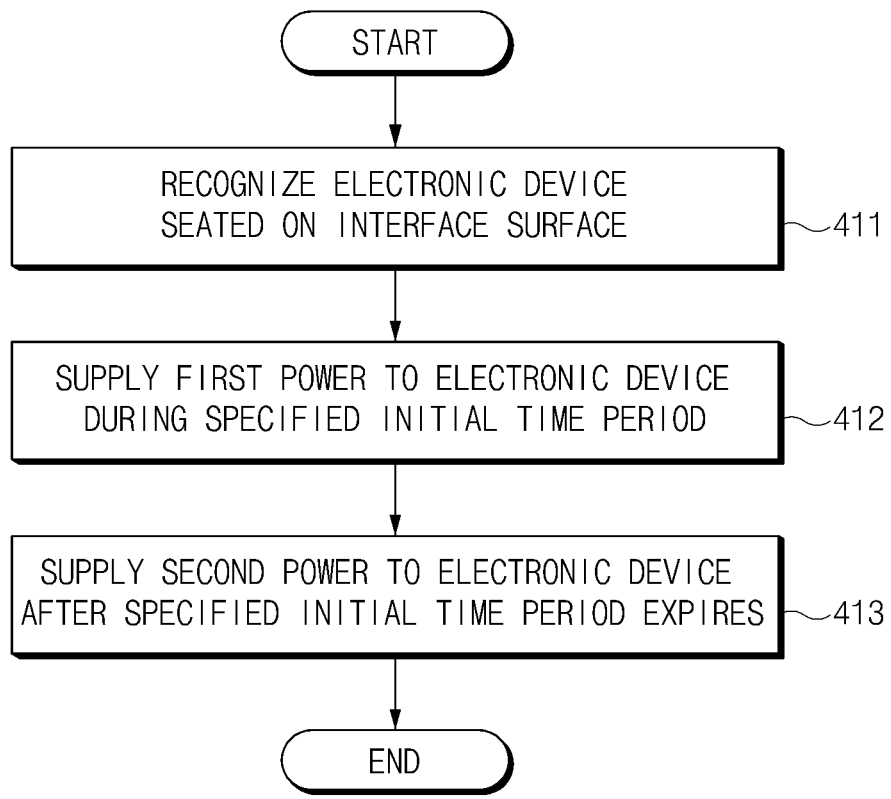
FIG. 4A is a flowchart illustrating an example power supplying method of a power transmitting device, according to various example embodiments.

FIG. 4A is a flowchart illustrating an example power supplying method of a power transmitting device, according to various example embodiments.

Referring to FIG. 4A, in operation 411, the power transmitting device 102 may recognize the electronic device 101 that is seated on an interface surface for power supply.

According to an embodiment, the power transmitting device 102 may recognize the electronic device 101 by sensing a change of an amount of power generated by the power transmitting circuit 250. For example, the power transmitting device 102 may verify the electronic device 101 by sensing that one or more of a frequency, a current, or a voltage of the power transmitting circuit 250 are changed.

According to another embodiment, the power transmitting device 102 may generate a search signal for recognizing devices around the power transmitting device 102. For example, the search signal may be a multicast or broadcast signal. The power transmitting device 102 may recognize the electronic device 101 by receiving a response signal corresponding to the search signal.

In operation 412, the power transmitting device 102 may supply first power to the electronic device 101 during a specified initial time period (e.g., 3 seconds). The first power may be higher in level than reference power that is generally output by the power transmitting device 102 for charging. The first power may be a power consumed by the power transmitting circuit 250 during a specified initial time period.

According to various embodiments, the first power may be displayed based on a charging current supplied to the conductive pattern 215. For example, the power transmitting device 102 may supply the charging current, the quantity of which is greater by 10% than that of a reference current for charging the electronic device 101, to the conductive pattern 215.

According to various embodiments, in the case where the charging current supplied to the conductive pattern 215 increases, a recognition area for recognizing the electronic device 101 may temporarily decrease in the interface surface. For example, in the case where the charging current increases, the recognition area may be changed into an area, which is equal to or smaller than normal charge area, in the normal charge area or a heat area.

According to various embodiments, the first power may be one of 1) a value that is determined in advance between the electronic device 101 and the power transmitting device 102, 2) a value defined in a power control signal that is transmitted to the power transmitting device 102 by the electronic device 101, or 3) a value determined in the power transmitting device 102.

In operation 413, the power transmitting device 102 may supply second power after a specified initial time period (e.g., 3 seconds) expires. For example, the second power may be a reference power that is output by the power transmitting device 102 for charging.

According to various embodiments, the second power may be lower in level than the first power in operation 412. For example, the power transmitting device 102 may supply the charging current, the amount of which is suitable for general charging, to the conductive pattern 215.

According to various embodiments, in the case where the charging current supplied to the conductive pattern 215 decreases, the recognition area for recognizing the electronic device 101 may increase in the interface surface. For example, in the case where the charging current increases, the recognition area may be changed into an area that is greater than the normal charge area and is smaller than the heat area.

Figure 4B:
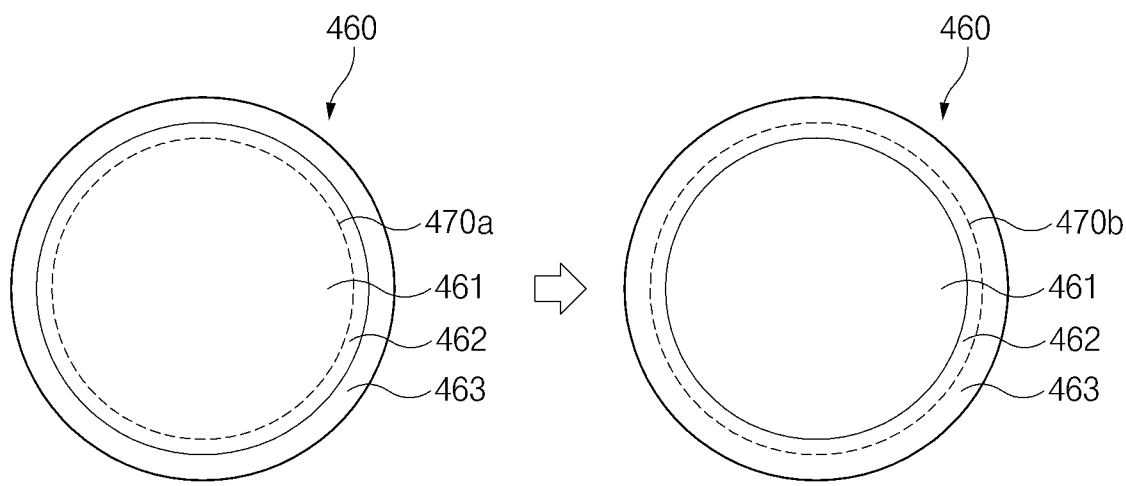
FIG. 4B is a diagram illustrating an example change of a recognition area in a power transmitting device, according to various example embodiments.

FIG. 4B is a diagram illustrating an example change of a recognition area in a power transmitting device, according to various example embodiments. FIG. 4B is an example, but the present disclosure is not limited thereto.

Referring to FIG. 4B, an interface surface 460 (e.g., a charging pad) of the power transmitting device 102 may include a normal charge area 461, a heat area 462, and a charge restriction area 463. In the case where the center of the conductive pattern 215 of the electronic device 101 is disposed in the normal charge area 461 and the heat area 462, wireless charging may proceed.

In the case where the center of the conductive pattern 215 is disposed in the normal charge area 461, the electronic device 101 may be normally charged within a specified temperature range. In the case where the center of the conductive pattern 215 is disposed in the heat area 462, the temperature of the electronic device 101 may increase above the specified temperature range in a charging procedure. In the case where the center of the conductive pattern 215 is disposed in the charge restriction area 463, charging may not proceed.

In a recognition initial state, the power transmitting device 102 may provide power, which is provided to the power transmitting circuit 250 during a specified initial time period, as first power higher than reference power. In this case, a recognition area (or an area in which wireless charging proceeds) 470a in which the power transmitting device 102 recognizes the electronic device 101 may be determined to be relatively small. For example, the recognition area 470a may be restricted to be equal to or smaller than the normal charge area 461.

According to various embodiments, the control circuit 220 of the electronic device 101 may adjust the recognition area by controlling a load value of the load 213. For example, the control circuit 220 may set the load value of the load 213 to be higher than a reference value by 10%. In this case, the charging current for charging the load 213 may increase. The power transmitting device 102 may reduce a range (or an area) in which power is transmitted in the interface surface (e.g., a charging pad) 460 to increase the charging current that the electronic device 101 requires.

In a state (hereinafter referred to as "misalignment state") where a user does not arrange a central axis of the conductive pattern 215 of the electronic device 101 to be adjacent to a central axis of the conductive pattern 255 of the power transmitting device 102 (e.g., in the case where the electronic device 101 is disposed in the heat area 462), the charging procedure may not proceed or the charging may be interrupted due to over temperature before the full charging. In a charging start step, the power transmitting device 102 may reduce a range of the recognition area 470a by outputting first power that is relatively high. To charge the electronic device 101, the power transmitting device 102 may guide the user to move the center of the conductive pattern 215 to be closer to the center of the normal charge area 461.

In a state where the charging proceeds, the power transmitting device 102 may provide the power transmitting circuit 250 with the second power, which is lower than the first power, after the specified initial time period expires. In this case, a recognition area 470b may be determined to be relatively large. For example, the recognition area 470b may be an area that is greater than the normal charge area 461 and is equal to or smaller than the heat area 462.

The power transmitting device 102 may allow a wireless charging procedure to stably proceed, by making the recognition area 470b wide while wireless charging is proceeding.

Figure 5:
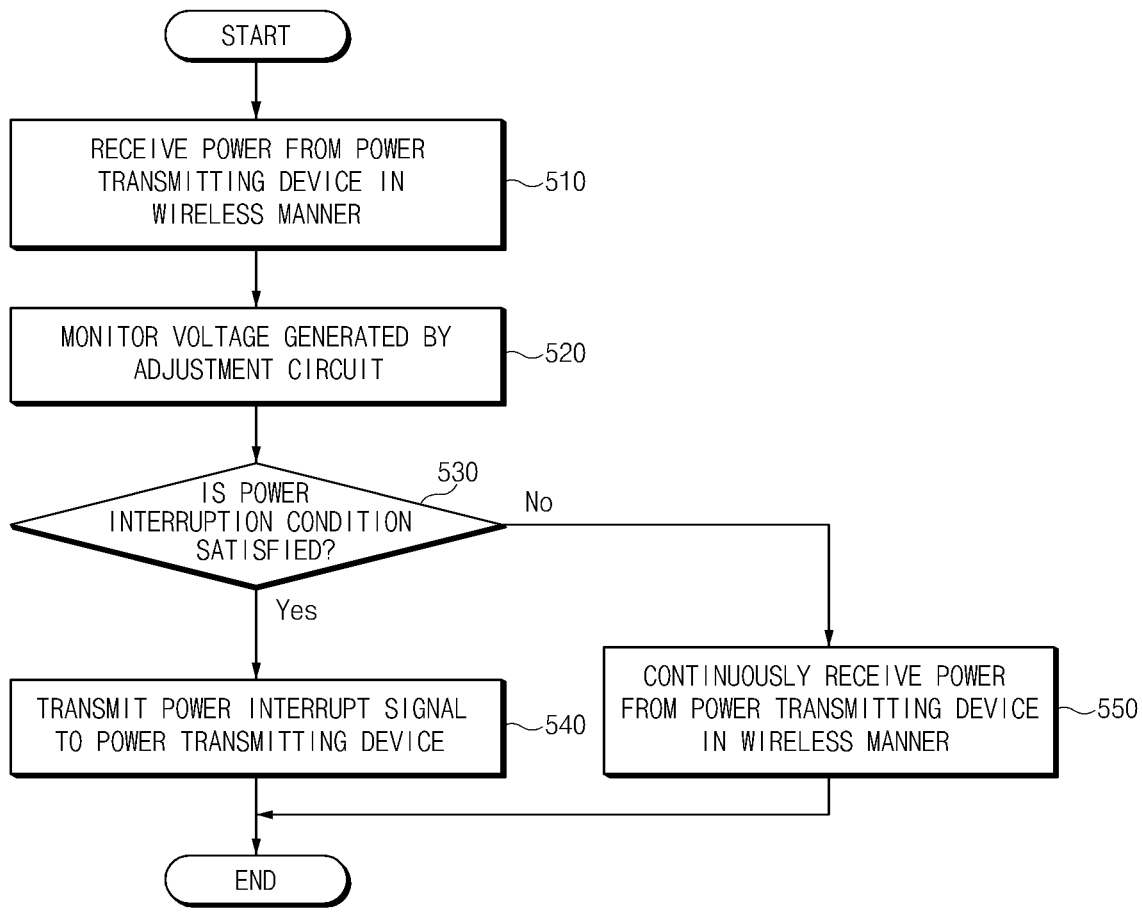
FIG. 5 is a flowchart illustrating an example power receiving method, according to various example embodiments.

FIG. 5 is a flowchart illustrating an example power receiving method, according to various example embodiments.

Referring to FIG. 5, in operation 510, the electronic device 101 may receive power from the power transmitting device 102 in a wireless manner. The electronic device 101 may be seated on an interface surface (or a charging surface) of the power transmitting device 102. Power transfer efficiency may vary depending on alignment between the electronic device 101 and the power transmitting device 102. For example, in the case where the conductive pattern 215 (or the center of the conductive pattern 215) of the electronic device 101 is disposed in the normal charge area 121, the power transfer efficiency may be relatively high.

In operation 520, the electronic device 101 may monitor a voltage generated by the adjustment circuit 212. For example, the electronic device 101 may monitor at least one of a rectification voltage Vrect or an output voltage Vout.

In operation 530, the electronic device 101 may determine whether the voltage satisfies a specified power interruption condition. The power interruption condition may include, for example, and without limitation, the following: a state where the voltage of the adjustment circuit swings between a high state and a low state, a state where the voltage of the adjustment circuit is out of a specified range and a preset time period expires, a state where the rectification voltage Vrect is present but a level of the output voltage Vout is significantly low or zero compared with a level of the rectification voltage Vrect, or the like.

In operation 540, in the case where the voltage satisfies the specified power interruption condition, the electronic device 101 may transmit a power interrupt signal to the power transmitting device 102 through the conductive pattern 215. According to various embodiments, the power interrupt signal may be a signal according to an EPT packet.

The power transmitting device 102 may interrupt power, which is transmitted to the power transmitting circuit 250, in response to the power interrupt signal. In this case, even though the electronic device 101 remains in a misalignment state, charging interrupt/resume may not be repeated. As such, heat may be prevented and/or reduced from being unnecessarily generated and usability may be prevented and/or reduced from deteriorating.

In operation 550, in the case where the voltage does not satisfy the specified power interruption condition, the electronic device 101 may continuously receive the power from the power transmitting device 102 in a wireless manner. For example, in the case where the charging is resumed after being temporarily interrupted, or in the case where a level of the rectification voltage Vrect or a level of the output voltage Vout is temporarily low but the rectification voltage Vrect or a level of the output voltage Vout is maintained again as a high-voltage, the electronic device 101 may continuously receive the power from the power transmitting device 102 in a wireless manner.

Figure 6:
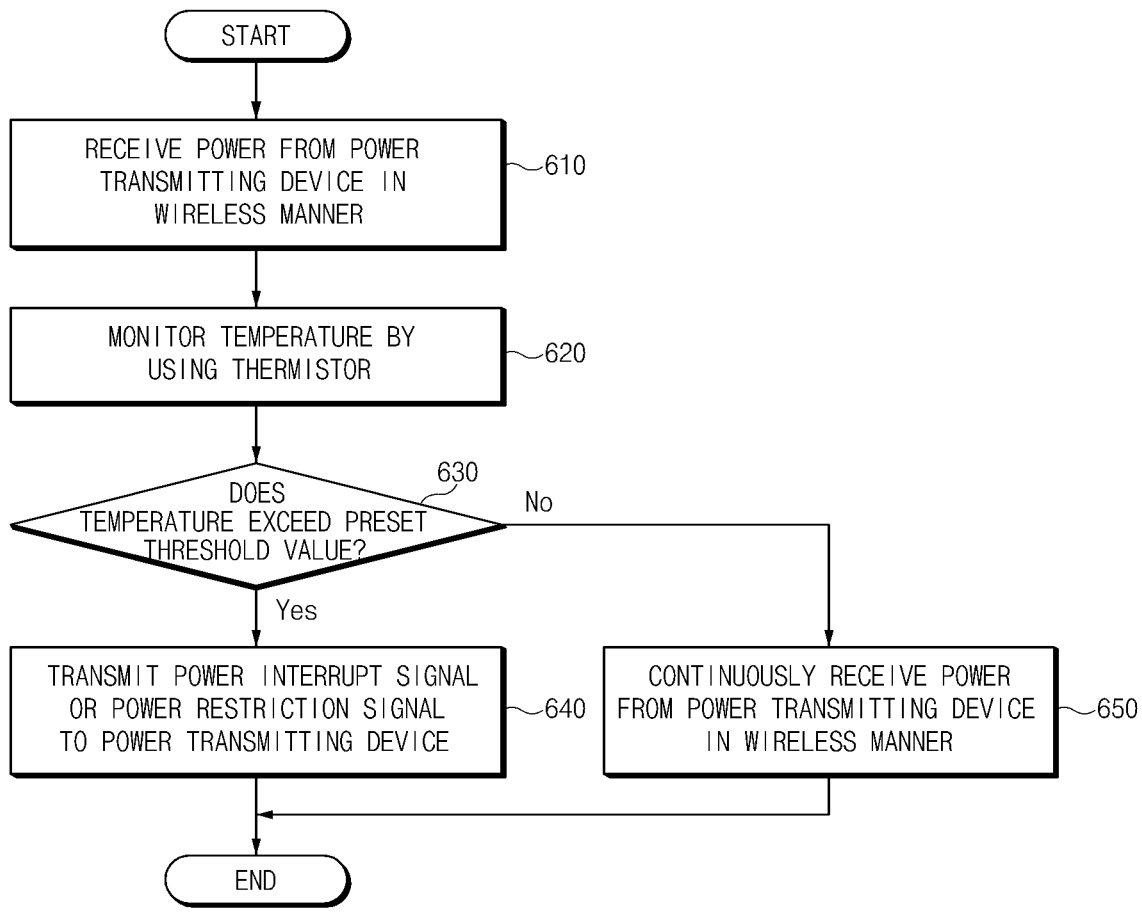
FIG. 6 is a flowchart illustrating an example power transmitting control according to temperature, according to various example embodiments.

FIG. 6 is a flowchart illustrating an example power transmitting control according to temperature, according to various example embodiments.

Referring to FIG. 6, in operation 610, the electronic device 101 may receive power from the power transmitting device 102 in a wireless manner. The electronic device 101 may be seated on an interface surface (or a charging surface) of the power transmitting device 102.

In operation 620, the electronic device 101 may monitor temperature associated with at least a part of the electronic device 101 using a thermistor included in the sensing circuit 230. According to various embodiments, the electronic device 101 may monitor the temperature at a point adjacent to the conductive pattern 215.

In operation 630, the electronic device 101 may determine whether the measured temperature exceeds a preset threshold value. The threshold value may be stored in advance in consideration of material for implementation, durability, battery material, and the like of the electronic device 101.

In operation 640, in the case where the measured temperature exceeds the preset threshold value, the electronic device 101 may transmit a power interrupt signal or a power restriction signal to the power transmitting device 102 through the power receiving circuit 210. According to various embodiments, the power interrupt signal or the power restriction signal may be a signal according to an EPT packet.

The power transmitting device 102 may interrupt power, which is transmitted to the power transmitting circuit 250, in response to the power interrupt signal. The power transmitting device 102 may restrict power, which is transmitted to the power transmitting circuit 250, in response to the power restriction signal such that the power is less than a specified value. As such, battery damage due to heat may be prevented.

In operation 650, in the case where the measured temperature is less than the preset threshold value, the electronic device 101 may continuously receive the power from the power transmitting device 102 in a wireless manner.

Figure 7:
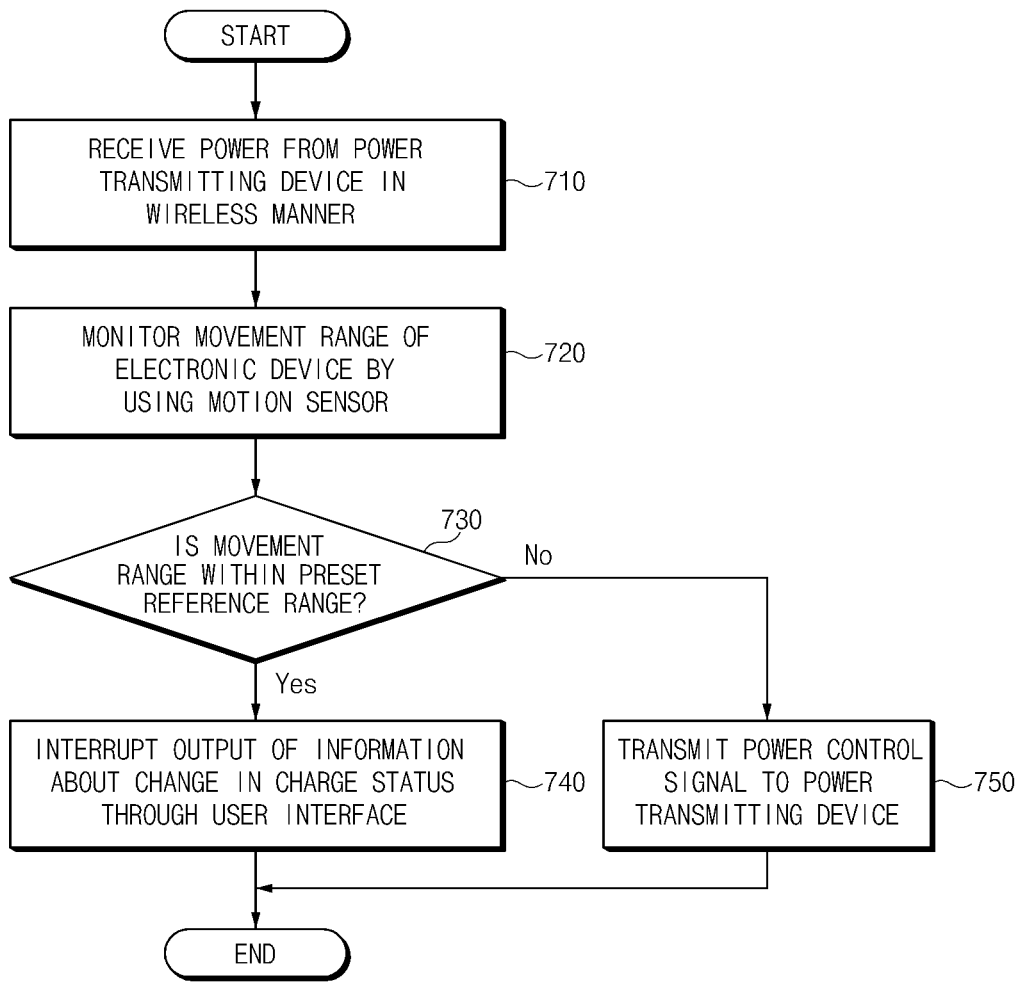
FIG. 7 is a flowchart illustrating an example power receiving method according to motion recognition, according to various example embodiments.

FIG. 7 is a flowchart illustrating an example power receiving method according to motion recognition, according to various example embodiments.

Referring to FIG. 7, in operation 710, the electronic device 101 may receive power from the power transmitting device 102 in a wireless manner. The electronic device 101 may be seated on an interface surface (or a charging surface) of the power transmitting device 102.

According to various embodiments, in the case where the electronic device 101 starts wireless charging, the electronic device 101 may notify a user of wake up screen, sound, vibration, or the like by using the user interface 240.

In operation 720, the electronic device 101 may monitor movement of the electronic device 101 using a motion sensor (e.g., an acceleration sensor) included in the sensing circuit 230.

In operation 730, the electronic device 101 may determine whether the movement range of the electronic device 101 collected through the motion sensor is within a preset reference range.

In operation 740, in the case where the movement range is within the preset reference range, the electronic device 101 may not output information about a change in a charge status through the user interface 240. For example, in the case where the electronic device 101 resumes a charging procedure after the charging pauses due to a temporary error of the power transmitting device 102 without the movement of the electronic device 101, the electronic device 101 may not output a separate pop-up box, sound, vibration, or the like. In the case where the electronic device 101 resumes the charging procedure after the charging procedure is temporarily interrupted, the user may not be unnecessarily disturbed.

According to various embodiments, in operation 750, in the case where the movement distance deviates from the preset reference range, the electronic device 101 may transmit the power interrupt signal to the power transmitting device 102 through the conductive pattern 215. According to various embodiments, the power interrupt signal may be a signal according to an EPT packet.

According to various example embodiments, a power receiving method performed by an electronic device includes recognizing an external power transmitting device, generating a power control signal including information about intensity of a power signal, which makes it possible to control the power signal output by the power transmitting device, transmitting the power control signal to the power transmitting device through a conductive pattern in which a current is induced depending on the power signal, receiving the power signal, the intensity of which is changed depending on the power control signal, through the conductive pattern, generating a voltage signal using the received power signal, and charging a load by using the voltage signal.

According to various example embodiments, the generating of the power control signal includes generating the power control signal for setting a level of the power signal to be greater than a preset reference power value.

According to various example embodiments, the method further includes verifying a change of the voltage signal, generating the power control signal for interrupting the power signal, if the change of the voltage signal satisfies a preset power interruption condition, and transmitting the power control signal to the power transmitting device through the conductive pattern.

According to various example embodiments, the verifying of the change of the voltage signal includes determining whether the change of the voltage signal exceeds a preset reference value, during a specified time period.

According to various example embodiments, the generating of the power control signal includes collecting sensing information about the electronic device and generating the power control signal based on the sensing information.

FIG. 8 is a diagram illustrating an example configuration of EPT data, according to various example embodiments.

Referring to FIG. 8, a power control signal generated by the control circuit 220 of the electronic device 101 may be generated through EPT data 801. The generated power control signal may be transmitted to the power transmitting device 102 through the conductive pattern 215.

The EPT data 801 may include a power interrupt reason 810 and power interrupt code (value) 820. The power interrupt reason 810 may include unknown 831, charge complete 832, internal fault 833, over temperature 834, over voltage 835, over current 836, battery failure 837, reconfigure 838, or no response 839.

According to various embodiments, reserved 840 may be used to determine intensity of a power signal output by the power transmitting device 102. For example, intensities of different power signals may be matched to codes included in the reserved 840, respectively. The control circuit 220 of the electronic device 101 may determine the intensity of a necessary power signal by applying an alignment state, a rectification voltage Vrect, an output voltage Vout, temperature, or the like of the electronic device 101. The control circuit 220 may transmit a code, which is matched to the intensity of the necessary power signal, to the power transmitting device 102 through the conductive pattern 215. The control circuit 260 of the power transmitting device 102 may output a power signal based on the corresponding code.

Figure 9:
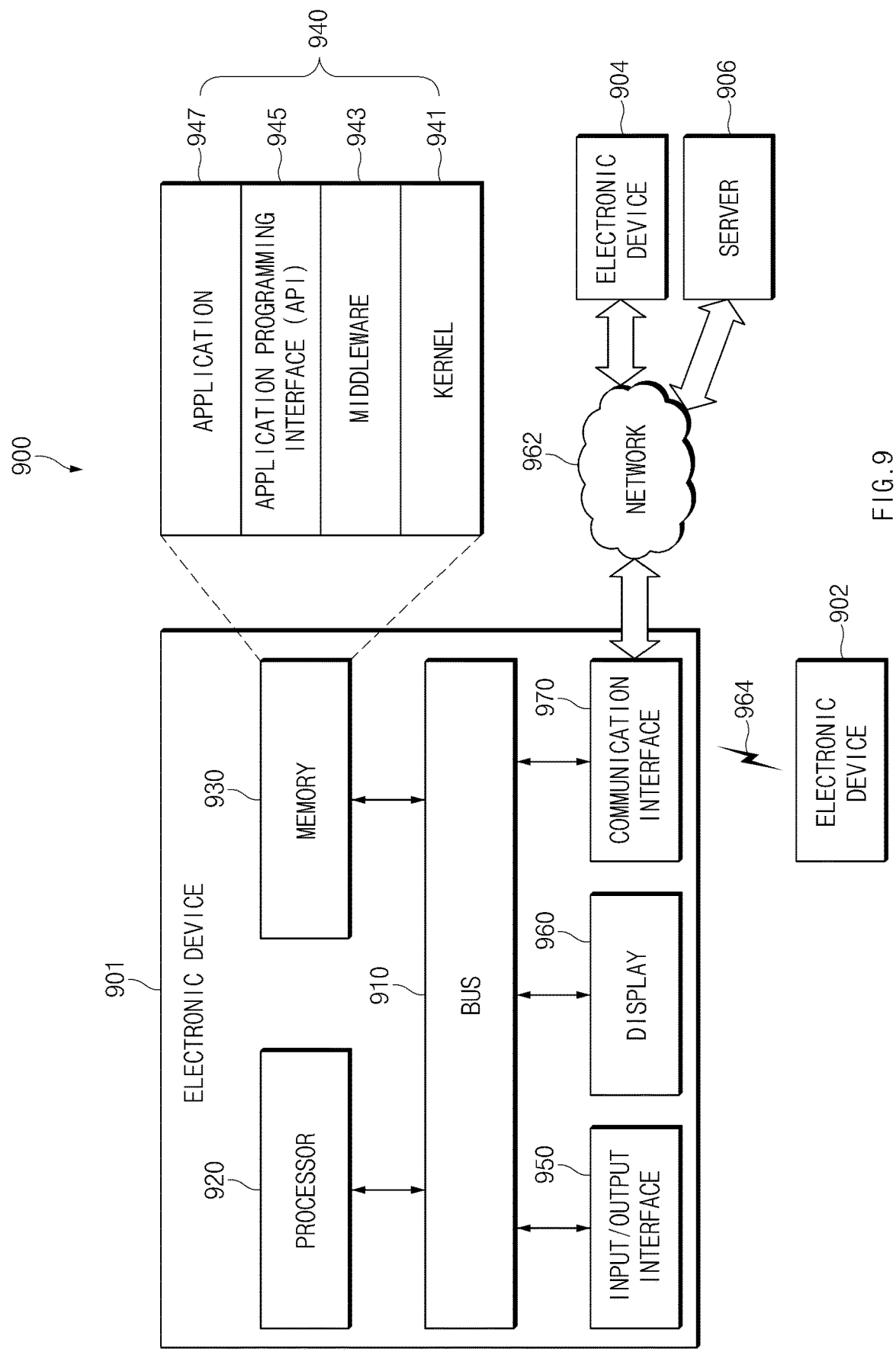
FIG. 9 is a diagram illustrating an electronic device in a network environment.

FIG. 9 is a diagram illustrating an example electronic device in a network environment according to an example embodiment of the present disclosure.

An electronic device 901 in a network environment 900 according to various embodiments of the present disclosure will be described with reference to FIG. 9. The electronic device 901 may include a bus 910, a processor (e.g., including processing circuitry) 920, a memory 930, an input/output interface (e.g., including input/output circuitry) 950, a display 960, and a communication interface (e.g., including communication circuitry) 970. In various embodiments of the present disclosure, at least one of the foregoing elements may be omitted or another element may be added to the electronic device 901.

The bus 910 may include a circuit for connecting the above-mentioned elements 910 to 970 to each other and transferring communications (e.g., control messages and/or data) among the above-mentioned elements.

The processor 920 may include various processing circuitry, such as, for example, and without limitation, at least one of a dedicated processor, a central processing unit (CPU), an application processor (AP), or a communication processor (CP). The processor 920 may perform data processing or an operation related to communication and/or control of at least one of the other elements of the electronic device 901.

The memory 930 may include a volatile memory and/or a nonvolatile memory. The memory 930 may store instructions or data related to at least one of the other elements of the electronic device 901. According to an embodiment of the present disclosure, the memory 930 may store software and/or a program 940. The program 940 may include, for example, a kernel 941, a middleware 943, an application programming interface (API) 945, and/or an application program (or an application) 947. At least a portion of the kernel 941, the middleware 943, or the API 945 may be referred to as an operating system (OS).

The kernel 941 may control or manage system resources (e.g., the bus 910, the processor 920, the memory 930, or the like) used to perform operations or functions of other programs (e.g., the middleware 943, the API 945, or the application program 947). Furthermore, the kernel 941 may provide an interface for allowing the middleware 943, the API 945, or the application program 947 to access individual elements of the electronic device 901 in order to control or manage the system resources.

The middleware 943 may serve as an intermediary so that the API 945 or the application program 947 communicates and exchanges data with the kernel 941.

Furthermore, the middleware 943 may handle one or more task requests received from the application program 947 according to a priority order. For example, the middleware 943 may assign at least one application program 947 a priority for using the system resources (e.g., the bus 910, the processor 920, the memory 930, or the like) of the electronic device 901. For example, the middleware 943 may handle the one or more task requests according to the priority assigned to the at least one application, thereby performing scheduling or load balancing with respect to the one or more task requests.

The API 945, which is an interface for allowing the application 947 to control a function provided by the kernel 941 or the middleware 943, may include, for example, at least one interface or function (e.g., instructions) for file control, window control, image processing, character control, or the like.

The input/output interface 950 may include various input/output circuitry and serve to transfer an instruction or data input from a user or another external device to (an)other element(s) of the electronic device 901. Furthermore, the input/output interface 950 may output instructions or data received from (an)other element(s) of the electronic device 901 to the user or another external device.

The display 960 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. The display 960 may present various content (e.g., a text, an image, a video, an icon, a symbol, or the like) to the user. The display 960 may include a touch screen, and may receive a touch, gesture, proximity or hovering input from an electronic pen or a part of a body of the user.

The communication interface 970 may include various communication circuitry and set communications between the electronic device 901 and an external device (e.g., a first external electronic device 902, a second external electronic device 904, or a server 906). For example, the communication interface 970 may be connected to a network 962 via wireless communications or wired communications so as to communicate with the external device (e.g., the second external electronic device 904 or the server 906). Additionally, the communication interface 970 may establish a short-range wireless communication connection 964 with an external device (e.g., first external electronic device 902).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 964. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 901 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 962 may include at least one of telecommunications networks, for example, a computer network (e.g., local area network (LAN) or wide area network (WAN)), the Internet, or a telephone network.

The types of the first external electronic device 902 and the second external electronic device 904 may be the same as or different from the type of the electronic device 901. According to an embodiment of the present disclosure, the server 906 may include a group of one or more servers. A portion or all of operations performed in the electronic device 901 may be performed in one or more other electronic devices (e.g., the first electronic device 902, the second external electronic device 904, or the server 906). When the electronic device 901 should perform a certain function or service automatically or in response to a request, the electronic device 901 may request at least a portion of functions related to the function or service from another device (e.g., the first electronic device 902, the second external electronic device 904, or the server 906) instead of or in addition to performing the function or service for itself. The other electronic device (e.g., the first electronic device 902, the second external electronic device 904, or the server 906) may perform the requested function or additional function, and may transfer a result of the performance to the electronic device 901. The electronic device 901 may use a received result itself or additionally process the received result to provide the requested function or service. To this end, for example, a cloud computing technology, a distributed computing technology, or a client-server computing technology may be used.

Figure 10:
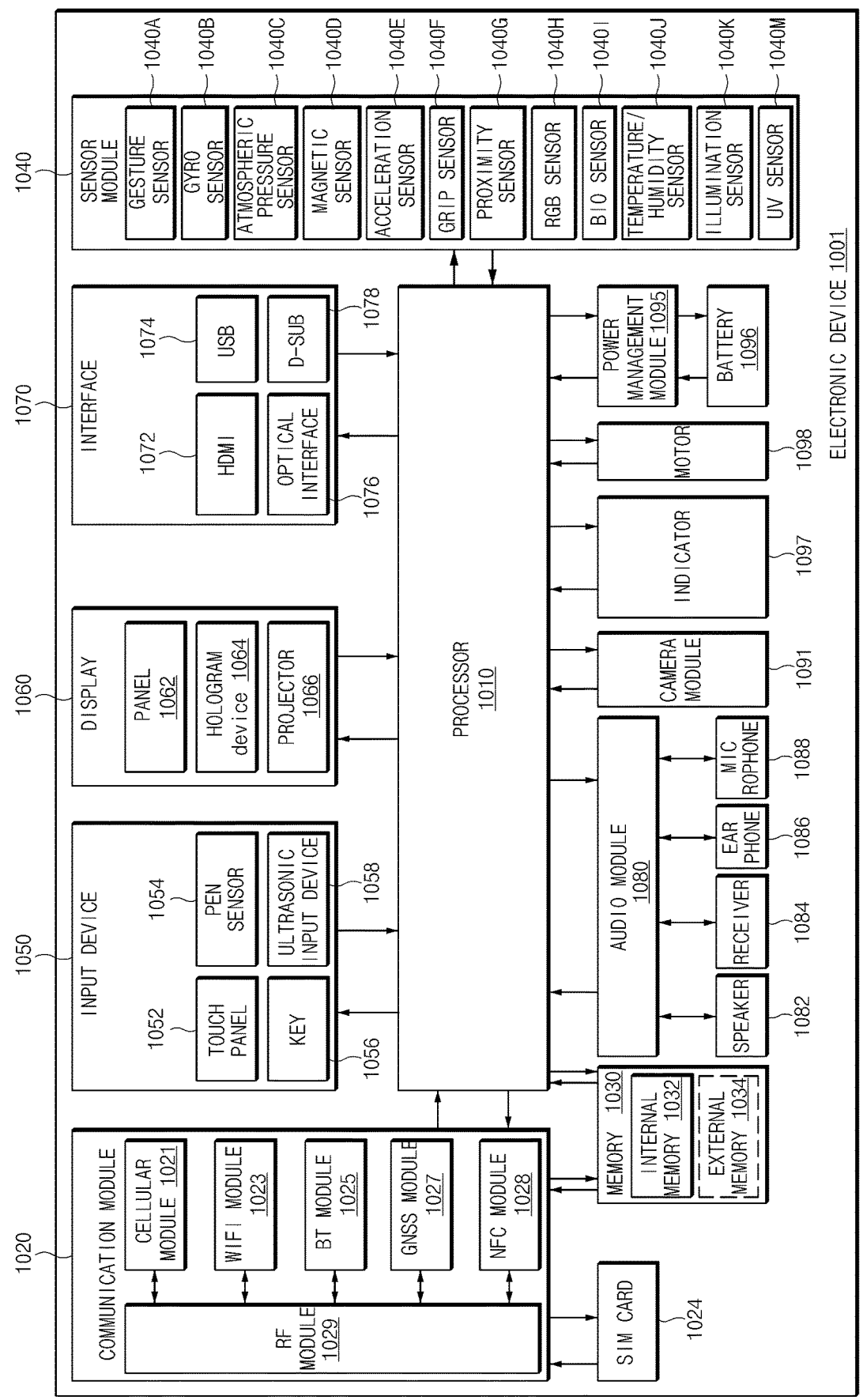
FIG. 10 is a block diagram illustrating an example electronic device, according to various example embodiments.

FIG. 10 is a block diagram illustrating an example electronic device according to an example embodiment of the present disclosure.

Referring to FIG. 10, an electronic device 1001 may include, for example, a part or the entirety of the electronic device 901 illustrated in FIG. 9. The electronic device 1001 may include at least one processor (e.g., AP) (e.g., including processing circuitry) 1010, a communication module (e.g., including communication circuitry) 1020, a subscriber identification module (SIM) 1024, a memory 1030, a sensor module 1040, an input device (e.g., including input circuitry) 1050, a display 1060, an interface (e.g., including interface circuitry) 1070, an audio module 1080, a camera module 1091, a power management module 1095, a battery 1096, an indicator 1097, and a motor 1098.

The processor 1010 may include various processing circuitry and run an operating system or an application program so as to control a plurality of hardware or software elements connected to the processor 1010, and may process various data and perform operations. The processor 1010 may be implemented with, for example, a system on chip (SoC). According to an embodiment of the present disclosure, the processor 1010 may further include a graphic processing unit (GPU) and/or an image signal processor. The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may have a configuration that is the same as or similar to that of the communication interface 970 of FIG. 9. The communication module 1020 may include various communication circuitry, such as, for example, and without limitation, a cellular module 1021, a Wi-Fi module 1023, a Bluetooth (BT) module 1025, a GNSS module 1027 (e.g., a GPS module, a GLONASS module, a BeiDou module, or a Galileo module), a NFC module 1028, and a radio frequency (RF) module 1029.

The cellular module 1021 may provide, for example, a voice call service, a video call service, a text message service, or an Internet service through a communication network. The cellular module 1021 may identify and authenticate the electronic device 1001 in the communication network using the subscriber identification module 1024 (e.g., a SIM card). The cellular module 1021 may perform at least a part of functions that may be provided by the processor 1010. The cellular module 1021 may include a communication processor (CP).

Each of the Wi-Fi module 1023, the Bluetooth module 1025, the GNSS module 1027 and the NFC module 1028 may include, for example, a processor for processing data transmitted/received through the modules. According to some various embodiments of the present disclosure, at least a part (e.g., two or more) of the cellular module 1021, the Wi-Fi module 1023, the Bluetooth module 1025, the GNSS module 1027, and the NFC module 1028 may be included in a single integrated chip (IC) or IC package.

The RF module 1029 may transmit/receive, for example, communication signals (e.g., RF signals). The RF module 1029 may include, for example, a transceiver, a power amp module (PAM), a frequency filter, a low noise amplifier (LNA), an antenna, or the like. According to another embodiment of the present disclosure, at least one of the cellular module 1021, the Wi-Fi module 1023, the Bluetooth module 1025, the GNSS module 1027, or the NFC module 1028 may transmit/receive RF signals through a separate RF module.

The SIM 1024 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1030 (e.g., the memory 930) may include, for example, an internal memory 1032 and/or an external memory 1034. The internal memory 1032 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive such as a compact flash (CF), a secure digital (SD), a Micro-SD, a Mini-SD, an extreme digital (xD), a MultiMediaCard (MMC), a memory stick, or the like. The external memory 1034 may be operatively and/or physically connected to the electronic device 1001 through various interfaces.

The sensor module 1040 may, for example, measure physical quantity or detect an operation state of the electronic device 1001 so as to convert measured or detected information into an electrical signal. The sensor module 1040 may include, for example, at least one of a gesture sensor 1040A, a gyro sensor 1040B, a barometric (e.g., atmospheric) pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a bio (e.g., biometric) sensor 1040I, a temperature/humidity sensor 1040J, an illumination sensor 1040K, or an ultraviolet (UV) sensor 1040M. Additionally or alternatively, the sensor module 1040 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In some various embodiments of the present disclosure, the electronic device 1001 may further include a processor configured to control the sensor module 1040 as a part of the processor 1010 or separately, so that the sensor module 1040 is controlled while the processor 1010 is in a sleep state.

The input device 1050 may include various input circuitry, such as, for example, and without limitation, a touch panel 1052, a (digital) pen sensor 1054, a key 1056, or an ultrasonic input device 1058. The touch panel 1052 may employ at least one of capacitive, resistive, infrared, and ultraviolet sensing methods. The touch panel 1052 may further include a control circuit. The touch panel 1052 may further include a tactile layer so as to provide a haptic feedback to a user.

The (digital) pen sensor 1054 may include, for example, a sheet for recognition which is a part of a touch panel or is separate. The key 1056 may include, for example, a physical button, an optical button, or a keypad. The ultrasonic input device 1058 may sense ultrasonic waves generated by an input tool through a microphone 1088 so as to identify data corresponding to the ultrasonic waves sensed.

The display 1060 (e.g., the display 960) may include a panel 1062, a hologram device 1064, or a projector 1066. The panel 1062 may have a configuration that is the same as or similar to that of the display 960 of FIG. 9. The panel 1062 may be, for example, flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include various interface circuitry, such as, for example, and without limitation, an HDMI 1072, a USB 1074, an optical interface 1076, or a D-subminiature (D-sub) 1078. The interface 1070, for example, may be included in the communication interface 970 illustrated in FIG. 9. Additionally or alternatively, the interface 1070 may include, for example, a mobile high-definition link (MHL) interface, an SD card/multi-media card (MMC) interface, or an infrared data association (IrDA) interface.

The audio module 1080 may convert, for example, a sound into an electrical signal or vice versa. At least a portion of elements of the audio module 1080 may be included in the input/output interface 950 illustrated in FIG. 9. The audio module 1080 may process sound information input or output through a speaker 1082, a receiver 1084, an earphone 1086, or the microphone 1088.

The camera module 1091 is, for example, a device for shooting a still image or a video. According to an embodiment of the present disclosure, the camera module 1091 may include at least one image sensor (e.g., a front sensor or a rear sensor), a lens, an image signal processor (ISP), or a flash (e.g., an LED or a xenon lamp).

The power management module 1095 may manage power of the electronic device 1001. According to an embodiment of the present disclosure, the power management module 1095 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. Although not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various example embodiments, an electronic device which is wirelessly charged through an external power transmitting device, the electronic device includes a conductive pattern in which a current is induced depending on a power signal transmitted by the power transmitting device, an adjustment circuit configured to generate a voltage signal by using the current, a load charged through the voltage signal, and a control circuit electrically connected with the conductive pattern, the adjustment circuit, and the load, wherein when recognizing the power transmitting device, the control circuit is configured to generate a power control signal including information about intensity of the power signal and to transmit the power control signal to the power transmitting device through the conductive pattern, and wherein the conductive pattern is configured to receive the power signal, the intensity of which is changed depending on the power control signal.

According to various example embodiments, the control circuit generates the power control signal for setting a level of the power signal to be greater than a preset reference power value.

According to various example embodiments, the conductive pattern receives a first power signal corresponding to the power control signal from the power transmitting device during a preset initial time period.

According to various example embodiments, the conductive pattern receives a second power signal, a level of which is lower than a level of the first power signal, after the initial time period expires.

According to various example embodiments, the power control signal has a data format that is the same as or similar to a format of an end of power transfer (EPT) packet.

According to various example embodiments, the control circuit transmits information about a load value of the load to the power transmitting device.

According to various example embodiments, the control circuit measures a change of the voltage signal and determines whether the change of the voltage signal satisfies a preset power interruption condition, and the power interruption condition includes a condition that the change of the voltage signal exceeds a preset reference value during a specified time period.

According to various example embodiments, the electronic device further includes a sensor circuit configured to collect sensing information about the electronic device, and the control circuit generates the power control signal based on the sensing information.

According to various example embodiments, the sensor circuit includes a thermistor configured to sense a temperature change at a point adjacent to the conductive pattern, and the control circuit generates the power control signal for interrupting the power signal, if temperature of the point exceeds a preset threshold value.

According to various example embodiments, the sensor circuit includes a direction sensor configured to sense a movement range of the electronic device, and the control circuit controls an output of information associated with interrupting the power signal based on the movement range of the electronic device.

According to various example embodiments, the control circuit generates the power control signal for interrupting the power signal if the movement range exceeds a specified value.

According to various example embodiments, the control circuit restricts an output of an image, sound, and vibration indicating the information, if the movement range is less than a specified value and if the power signal is paused.

According to various example embodiments, a power transmitting device which supplies power to an external electronic device, the power transmitting device includes a conductive pattern configured to transmit a power signal to the electronic device, a power generating circuit configured to supply the power to the conductive pattern and a control circuit electrically connected with the conductive pattern and the power generating circuit, wherein the control circuit is configured to receive a power control signal including information about intensity of the power signal through the conductive pattern and controls the intensity of the power signal based on the power control signal. The control circuit sets a level of the power signal to be greater than a preset reference power value during a preset initial time period, if recognizing the electronic device. The control circuit changes the level of the power signal into the reference power value after the initial time period expires.

The term "module" used herein may refer, for example, to a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various example embodiments of the present disclosure may be implemented as instructions stored in a computer-readable storage medium in the form of a program module. In the case where the instructions are performed by a processor (e.g., the processor 920), the processor may perform functions corresponding to the instructions. The computer-readable storage medium may be, for example, the memory 930.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various example embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various example embodiments of the present disclosure, a power transmitting method and an electronic device supporting the same may transmit a power control signal (e.g., an EPT packet) to a power transmitting device (e.g., a wireless charging pad) through a conductive pattern (e.g., a coil) to control the output power.

According to various example embodiments of the present disclosure, the power transmitting method and the electronic device supporting the same may transmit the power control signal through the conductive pattern (e.g., the coil) and may increase or decrease an area in which charging is possible.

According to various example embodiments of the present disclosure, the power transmitting method and the electronic device supporting the same may stably control output power of a power transmitting device (e.g., a wireless charging pad) in consideration of a temperature change or motion variation of the electronic device.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. A system including an electronic device and a power transmitting device, the electronic device configured to be wirelessly charged through the power transmitting device, the electronic device comprising:
   a conductive pattern configured to have a current induced therein based on a power signal transmitted by the power transmitting device;
   an adjustment circuit configured to generate a voltage signal using the current;
   a load configured to be charged through the voltage signal;
   a sensor circuit including a motion sensor configured to sense a movement of the electronic device; and
   a control circuit electrically connected with the conductive pattern, the adjustment circuit, the load, and the sensor circuit,
   wherein, the control circuit is configured to:
      in response to determining that a range of the movement of the electronic device is within a specified range, restrict an output of information associated with a change in a charge status so that stopping charging due to a temporary interruption in charging and then restarting the charging after the temporary interruption does not cause a user of the electronic device to be disturbed; and
      in response to determining that the range of the movement of the electronic device is not within the specified range, cause to be transmitted a first power control signal to the power transmitting device for controlling the power signal,
   wherein an interface surface of the power transmitting device includes a normal charge area, a heat area, and a charge restriction area,
   wherein wireless charging proceeds in a case where a center of the conductive pattern of the electronic device is disposed in the normal charge area and the heat area,
   wherein during a specified initial time period, the power transmitting device restricts a recognition area to be equal to or smaller than the normal charge area, and
   wherein after the initial time period expires in a state where the wireless charging proceeds, the power transmitting device determines the recognition area to be greater than the normal charge area and is equal to or smaller than the heat area.

2. The system of claim 1, wherein the control circuit is configure to generate a second power control signal for setting a level of the power signal to be greater than a preset reference power value.

3. The system of claim 2, wherein the conductive pattern is configured to receive a first power signal from the power transmitting device during the initial time period.

4. The system of claim 3, wherein the conductive pattern is configured to receive a second power signal after the initial time period expires, a level of the second power signal being lower than a level of the first power signal.

5. The system of claim 1, wherein the first power control signal has a data format comprising an end of power transfer (EPT) packet.

6. The system of claim 1, wherein the control circuit is configured to transmit information about a load value of the load to the power transmitting device.

7. The system of claim 1, wherein the control circuit is configured to determine a change of the voltage signal and to determine whether the change of the voltage signal satisfies a preset power interruption condition, and
   wherein the preset power interruption condition comprises a condition in which the change of the voltage signal exceeds a preset reference value during a specified time period.

8. The system of claim 1, wherein the sensor circuit further includes:
   a thermistor configured to sense a temperature change at a point adjacent to the conductive pattern, and
   wherein the control circuit is configured to generate the first power control signal for reducing the power signal if temperature of the point exceeds a preset threshold value.

9. The system of claim 1, wherein the output of information associated with the change in the charge status comprises at least one of an image, sound, or vibration indicating the movement of the electronic device.

10. A power transmitting and receiving method of a system including an electronic device and a power transmitting device, the method comprising:
    recognizing the power transmitting device;
    receiving a power signal from the power transmitting device;
    generating a voltage signal using the received power signal;
    charging a load using the voltage signal;
    sensing a movement of the electronic device while charging the load;
    in response to determining that a range of the movement of the electronic device is within a specified range, restricting an output of information associated with a change in a charge status so that stopping charging due to a temporary interruption in charging and then restarting the charging after the temporary interruption does not cause a user of the electronic device to be disturbed; and
    in response to determining that the range of the movement of the electronic device is not within the specified range, transmitting a first power control signal to the power transmitting device for controlling the power signal,
    wherein an interface surface of the power transmitting device includes a normal charge area, a heat area, and a charge restriction area,
    wherein wireless charging proceeds in a case where a center of a conductive pattern of the electronic device is disposed in the normal charge area and the heat area,
    wherein during a specified initial time period, the power transmitting device restricts a recognition area to be equal to or smaller than the normal charge area, and
    wherein after the initial time period expires in a state where the wireless charging proceeds, the power transmitting device determines the recognition area to be greater than the normal charge area and is equal to or smaller than the heat area.

11. The method of claim 10, further comprising:
generating a second power control signal for setting a level of the power signal to be greater than a preset reference power value.

12. The method of claim 10, further comprising:
verifying a change of the voltage signal;
generating the first power control signal if the change of the voltage signal satisfies a preset power interruption condition; and
transmitting the first power control signal to the power transmitting device through the conductive pattern.

13. The method of claim 12, wherein the verifying of the change of the voltage signal includes:
determining whether the change of the voltage signal exceeds a preset reference value during a specified time period.

* * * * *